(12) United States Patent
Branham

(10) Patent No.: US 9,067,839 B2
(45) Date of Patent: Jun. 30, 2015

(54) VERMICOMPOSTING DEVICE

(75) Inventor: James Branham, Plainfield, IN (US)

(73) Assignee: Frontier Paper & Packaging, Inc., Indianapolis, IN (US)

( * ) Notice: Subject to any disclaimer, the term of this patent is extended or adjusted under 35 U.S.C. 154(b) by 804 days.

(21) Appl. No.: 13/082,707

(22) Filed: Apr. 8, 2011

(65) Prior Publication Data

US 2012/0244611 A1 Sep. 27, 2012

Related U.S. Application Data

(60) Provisional application No. 61/454,816, filed on Mar. 21, 2011.

(51) Int. Cl.
C12M 1/14 (2006.01)
C05F 17/00 (2006.01)
C05F 17/02 (2006.01)

(52) U.S. Cl.
CPC ......... C05F 17/0009 (2013.01); C05F 17/0205 (2013.01)

(58) Field of Classification Search
CPC ............. C05F 17/0205; C05F 17/0252; C05F 17/0009; C05F 17/0211; C05F 17/02; B65F 1/00; B65F 2001/1489; A01K 67/0332
USPC ................. 435/290.1, 290.3, 290.4; 206/507; 119/6.7
See application file for complete search history.

(56) References Cited

U.S. PATENT DOCUMENTS

| 3,831,310 | A | * | 8/1974 | Frangullie | 43/56 |
| 3,961,603 | A | * | 6/1976 | Gaddie, Sr. | 119/6.7 |
| 4,042,219 | A | | 8/1977 | Terry | |
| 4,148,154 | A | * | 4/1979 | King | 47/66.6 |
| 5,197,801 | A | | 3/1993 | Swisher | |
| 5,300,438 | A | | 4/1994 | Augspurger et al. | |
| 6,056,800 | A | | 5/2000 | Carter | |
| 6,450,362 | B1 | | 9/2002 | Laurion | |
| 7,135,332 | B2 | | 11/2006 | Ouellette | |
| 2003/0059931 | A1 | * | 3/2003 | Gitt | 435/290.1 |
| 2008/0209967 | A1 | * | 9/2008 | Cohn | 71/9 |
| 2010/0031893 | A1 | * | 2/2010 | Bodlovich et al. | 119/227 |
| 2010/0273251 | A1 | * | 10/2010 | Rhoads et al. | 435/290.1 |

* cited by examiner

Primary Examiner — William H Beisner
Assistant Examiner — Danielle Henkel
(74) Attorney, Agent, or Firm — Woodard, Emhardt, Moriarty, McNett & Henry LLP

(57) ABSTRACT

A vermicomposting device for vermicomposting organic material, comprises a casing including an annular hollow body member defining an internal cavity, a head member mounted to an upper end portion of the body member and a base member removably attached to a lower end portion of the body member, and a plurality of composting trays removably disposed within the internal cavity in a stacked relationship. Each of the composting trays is an open top tray including a circular perforated bottom wall surrounded by an annular side wall upwardly extending from the perforated bottom wall. The base member includes a support portion and a drip bucket disposed under the composting trays to receive and collect any liquid byproduct from the vermicomposting process. The head member is movable relative to the body member so as to provide an access to the internal cavity of the body member.

20 Claims, 12 Drawing Sheets

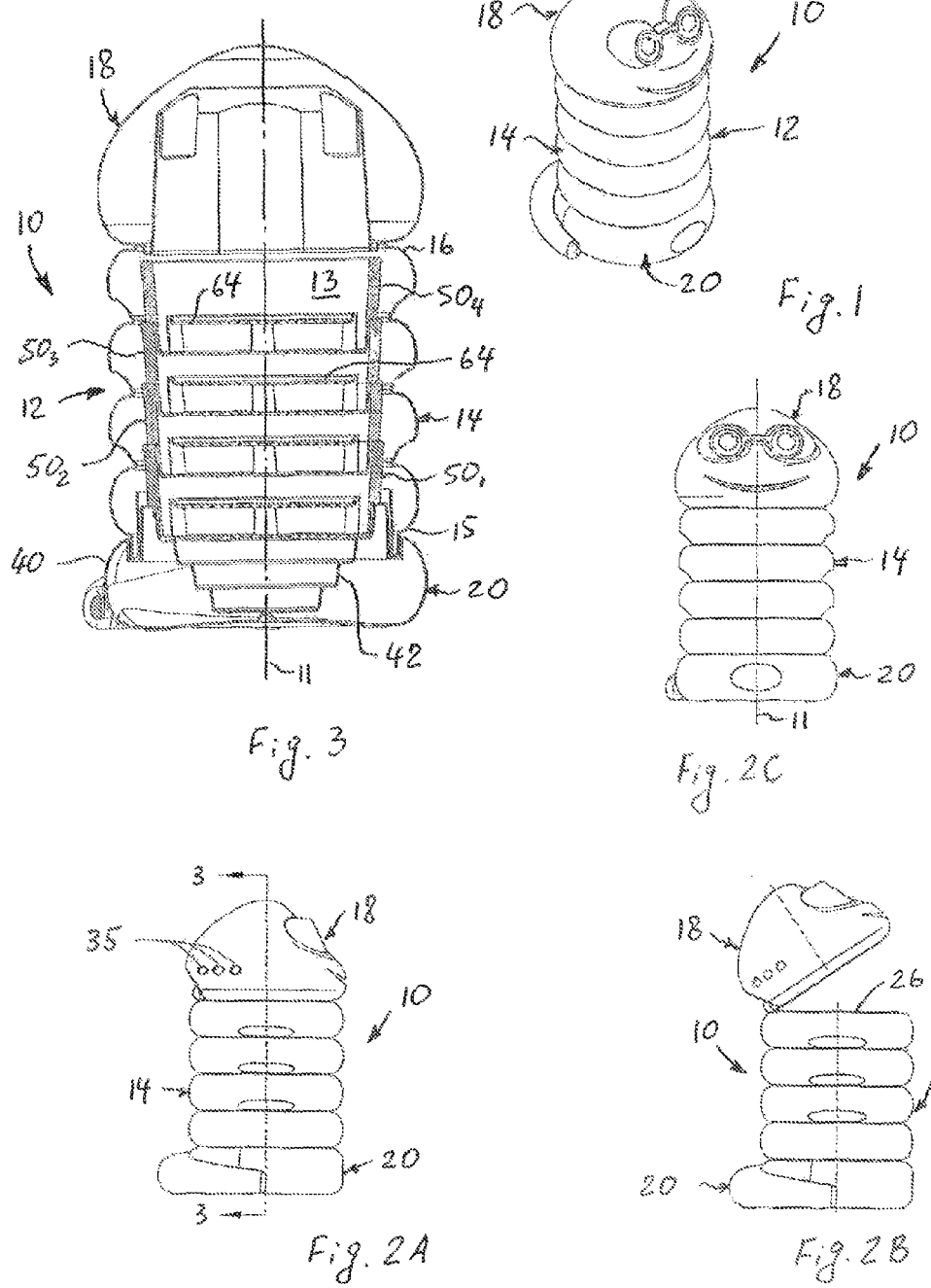

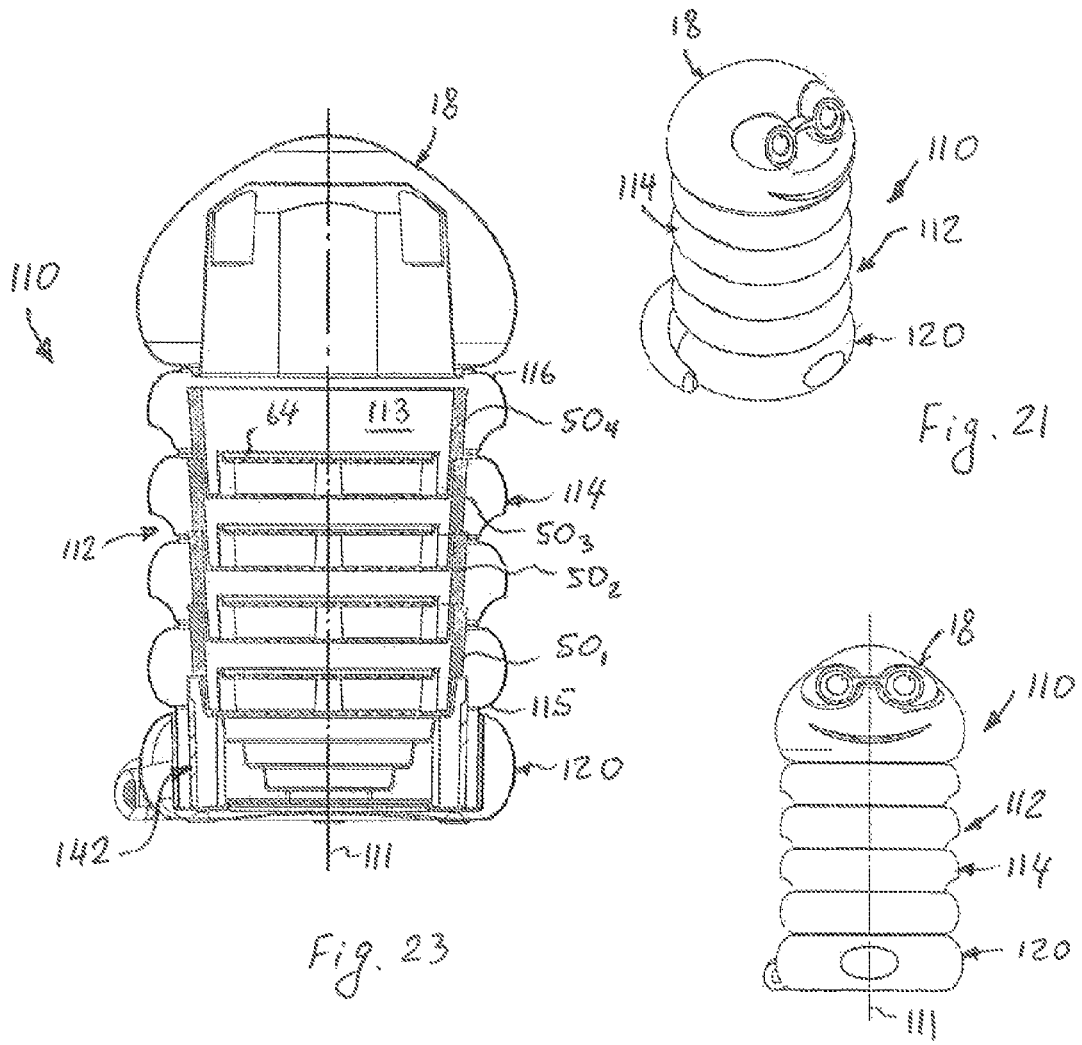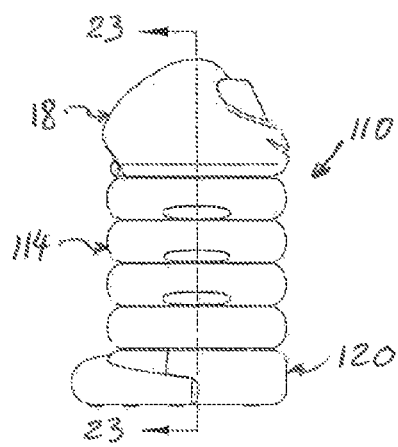

VERMICOMPOSTING DEVICE

CROSS-REFERENCE TO RELATED APPLICATION

This Application claims the benefit under 35 U.S.C. 119(e) of U.S. Provisional Patent Application Ser. No. 61/454,816 filed Mar. 21, 2011 by Branham, J., which is hereby incorporated herein by reference in its entirety and to which priority is claimed.

BACKGROUND OF INVENTION

1. Field of the Invention

This invention relates to composting devices for vermicomposting of organic waste material in general, and, more particularly, to a vermicomposting device that receives organic waste material to produce compost using worms to break down organic waste material.

2. Description of the Prior Art

The process of vermicomposting or transforming organic waste materials into natural fertilizers and/or soil additives with the use of worms is well-known to those skilled in the art. Vermicomposting process uses worms to recycle food scraps and other organic material, especially vegetable household waste and light garden waste, into a valuable soil amendment called vermicompost, or worm compost. Worms consume, digest and absorb largely organic matter, such as food scraps, which become compost as they pass through the worm's body. Compost exits the worm through its tail end. This compost can then be used to grow plants. In other words, the worms are eating nutrient-rich fruit and vegetable scraps, and turning them into nutrient-rich compost.

In order for the vermicomposting process to provide optimal results, certain conditions must exist. For example, the micro-organisms and worms, which decompose the organic waste material require an environment with adequate amounts of air, water, and nutrients to support metabolic activity. In the case of aerobic composting, the ambient air is the primary source of oxygen. Thus, the circulation of ambient air within the compost pile must be sufficient to meet the metabolic requirements of the microbes as well as to disperse the waste gases including methane gas, which is produced as a by-product of the process. Vermicomposting proceeds most efficiently within a certain temperature range as with the case of any chemical reaction. Vermicomposting is accelerated if the compost pile is insulated such that the heat generated by the decaying process is contained within the compost pile.

While known vermicomposting devices have proven to be acceptable for various gardening applications, such devices are nevertheless susceptible to improvements that may enhance their performance, applicability, cost and attractiveness. With this in mind, a need exists to develop improved vermicomposting device that advances the art.

SUMMARY OF THE INVENTION

The present invention is directed a vermicomposting device for vermicomposting of organic waste material.

The vermicomposting device according to the present invention comprises a casing extending along a central axis and including a substantially annular hollow body member defining an internal cavity and having a lower end portion and an upper end portion, a head member mounted to the upper end portion of the body member, and a base member removably attached to the lower end portion of the body member for supporting the vermicomposting apparatus on a support surface, and a plurality of composting trays removably disposed within the internal cavity in a stacked relationship in the direction of the central axis. Each of the composting trays is in the form of an open top tray that includes a circular perforated bottom wall surrounded by an annular side wall upwardly extending from the perforated bottom wall so as to form a cavity adapted to contain a composting material and/or ready to use compost and worms. The base member includes a support portion and a drip bucket mounted to the support portion and defines a container disposed under the composting trays to receive and collect any liquid byproduct from the vermicomposting process drained down into the drip tray through the perforated bottom wall of the composting trays. The drip bucket is in the form of an open top bucket that includes a circular solid bottom wall surrounded by an annular side wall upwardly extending from the bottom wall toward the composting trays. The head member is movable relative to the body member so as to provide an access to the internal cavity of the body member.

BRIEF DESCRIPTION OF THE DRAWINGS

The above and other objects and advantages and novel features will become apparent from the detailed description of the preferred embodiments of the invention illustrated in the accompanying drawings, wherein:

FIG. 1 is a perspective view of a vermicomposting device according to a first exemplary embodiment of the present invention;

FIG. 2A is a side view of the vermicomposting device according to the first exemplary embodiment of the present invention with a head member in a closed position;

FIG. 2B is a side view of the vermicomposting device according to the first exemplary embodiment of the present invention with the head member in an open position;

FIG. 2C is a front view of the vermicomposting device according to the first exemplary embodiment of the present invention;

FIG. 3 is a vertical cross-sectional view of the vermicomposting device according to the first exemplary embodiment of the present invention taken along the lines 3-3 in FIG. 2A;

FIG. 21 is a perspective view of a vermicomposting device according to a second exemplary embodiment of the present invention;

FIG. 22A is a side view of the vermicomposting device according to the second exemplary embodiment of the present invention;

FIG. 22B is a front view of the vermicomposting device according to the second exemplary embodiment of the present invention;

FIG. 23 is a vertical cross-sectional view of the vermicomposting device according to the second exemplary embodiment of the present invention taken along the lines 3-3 in FIG. 2A;

DETAILED DESCRIPTION OF PREFERRED EMBODIMENTS

Figure 4:
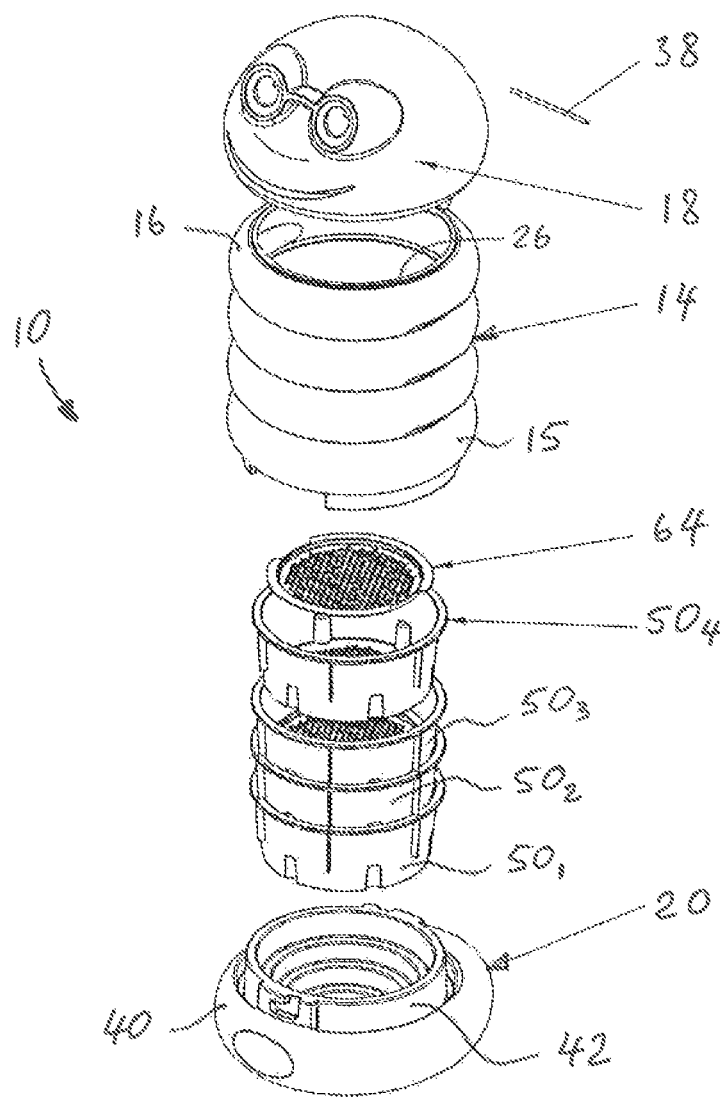
FIG. 4 is an exploded perspective view of the vermicomposting device according to the first exemplary embodiment of the present invention.

The preferred exemplary embodiments of the present invention will now be described with the reference to the accompanying drawings.

For purposes of the following description, certain terminology is used in the following description for convenience only and is not limiting. The words such as "front" and "rear", "left" and "right", "top" and "bottom", "upper" and "lower", "inwardly" and "outwardly" designate directions in the drawings to which reference is made. The words "smaller" and "larger" refer to relative size of elements of the apparatus of the present invention and designated portions thereof. The terminology includes the words specifically mentioned above, derivatives thereof and words of similar import. Additionally, the word "a", as used in the claims, means "at least one".

Vermicompost is a product of composting utilizing various species of worms, specifically red wigglers, white worms, and earthworms creating the heterogeneous mixture of decomposing vegetable or food waste, bedding materials, and pure vermicast produced during the course of normal vermiculture operations. Vermicast, similarly known as worm castings, worm humus or worm manure, is the end-product of the breakdown of organic matter by the species of earthworm. Containing water-soluble nutrients and bacteria, vermicompost is an excellent, nutrient-rich organic fertilizer and soil conditioner. The process of producing vermicompost is called vermicomposting.

The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

FIGS. 1-20 illustrate a vermicomposting device according to according to a first exemplary embodiment of the present invention, generally denoted by reference numeral 10. As shown in FIGS. 1-4, the vermicomposting device 10 comprises a hollow casing 12 extending along a central axis 11 and defining an internal cavity 13 therein. The casing 12 includes a substantially annular, hollow body member 14, a head member 18 and a base member 20. The body member 14 has a lower end portion 15 and an upper end portion 16. Further according to the present invention, the head member 18 is pivotally mounted to the upper end portion 16 of the body member 14, while the base member 20 is removably attached to the lower end portion 15 of the body member 14 for supporting the vermicomposting device 10 in an upright, vertical position on a support surface, such as ground of a backyard. The casing 12 of the vermicomposting device 10 according to the present invention is made in the shape of an animal including a worm, a bug, a reptile, a bird or a mammal. For the purpose of this invention, the term animal applies to any of a kingdom (Animalia) of living things including many-celled organisms and often many of the single-celled ones (as protozoans) that typically differ from plants in having cells without cellulose walls, in lacking chlorophyll and the capacity for photosynthesis, in requiring more complex food materials (as proteins), in being organized to a greater degree of complexity, and in having the capacity for spontaneous movement and rapid motor responses to stimulation. Preferably, as illustrated in FIGS. 1-4, the casing 12 of the vermicomposting device 10 is made in the shape of a stylized earthworm in an upright position.

Each part of the casing 12, i.e. the body member 14, the head member 18 and the base member 20, is made of a weather-proof, highly insulated material, such as polyethylene resin or bio-based plastic, including biodegradable bioplastics. Bioplastics or organic plastics are a form of plastics derived from renewable biomass sources, such as vegetable oil, corn starch, pea starch, or microbiota rather than fossil-fuel plastics which are derived from petroleum. Some, but not all, bioplastics are biodegradable.

Figure 5:
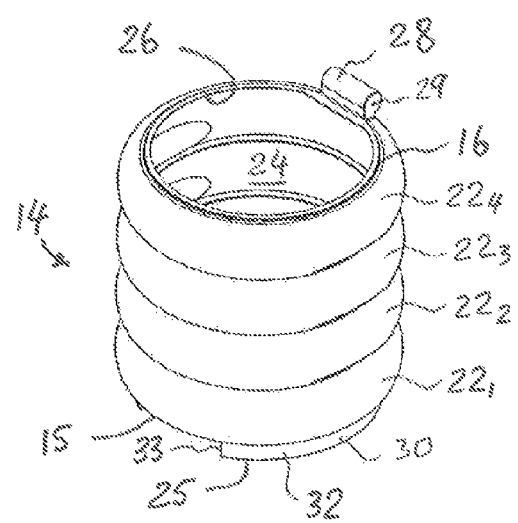
FIG. 5 is a perspective view of a body member of the vermicomposting device according to the first exemplary embodiment of the present invention.
Figure 6:
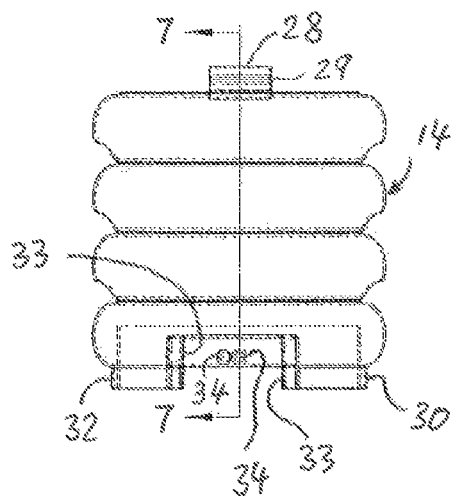
FIG. 6 is a front view of the body member of the vermicomposting device according to the first exemplary embodiment of the present invention.
Figure 7:
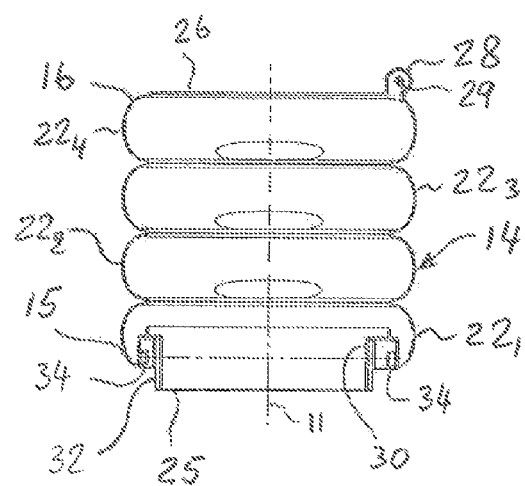
FIG. 7 is a vertical cross-sectional view of the body member of the vermicomposting device according to the first exemplary embodiment of the present invention taken along the lines 7-7 in FIG. 6.
Figure 10:
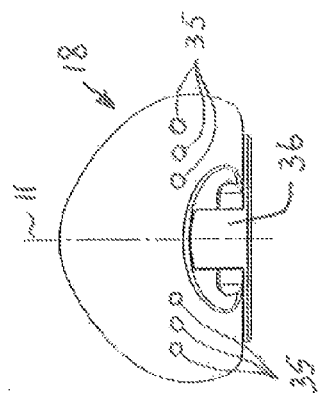
FIG. 10 is a vertical cross-sectional view of the head member of the vermicomposting device according to the first exemplary embodiment of the present invention taken along the lines 10-10 in FIG. 9A.

The substantially annular body member 14 is formed as a hollow single-piece part made for example by rotational molding. Preferably, as illustrated in FIGS. 5-7, the body member 14 includes a number, such as four, ring portions $22_1$, $22_2$, $22_3$ and $22_4$ disposed in a stacked relationship (i.e., one on top of the other) along the central axis 11. Each ring is a surface of revolution generated by revolving a semi-circle in three dimensional space about the central axis 11 coplanar with the semi-circle. The hollow body member 14 is axially open at both the lower end portion 15 and the upper end portion 16, and defines an internal cavity 24 delimited by a circular lower opening 25 at the lower end portion 15 and a circular upper opening 26 at the upper end portion 16 of the body member 14. As shown in FIGS. 6 and 7, the lower and upper openings 25 and 26 are coaxial with each other and with the central axis 11. The upper opening 26 provides an access to the internal cavity 13 in the body member 14. The body member 14 of the hollow casing 12, illustrated in detail in FIGS. 1-4, is, preferably, in the form of a stylized body of the earthworm.

The body member 14 further includes a hinge support 28 formed integrally therewith and provided at the upper opening 26 of the upper end portion 16 of the body member 14. Specifically, as shown in detail in FIGS. 5-7, the hinge support 28 is formed on top of the upper ring portion $22_4$ of the body member 14 so as to extend above the upper opening 26 of the body member 14. The hinge support 28 is provided with a pin hole 29 therethrough.

The body member 14 further includes a support portion 30 fixed to the body member 14 below the lower ring portion $22_1$. The support portion 30 includes a substantially cylindrical flange skirt 32 connecting the body member 14 with the base member 20. As illustrated in detail in FIGS. 5-7, the cylindrical flange skirt 32 is coaxial with the central axis 11 and extends below the lower ring portion $22_1$ of the body member 14. The flange skirt 32 is provided with a pair of opposite windows (or cut-outs) 33 formed in a cylindrical surface thereof. The support portion 30 further includes a pair of opposite, inwardly projecting pins 34 facing the cut-outs 33 in the cylindrical flange skirt 32. It will be appreciated that while the first exemplary embodiment of the present invention discloses the support portion 30 with two pins 34, any appropriate number of pins 34, such as one, three, etc., is within the scope of the present invention.

The head member 18 of the hollow casing 12, illustrated in detail in FIGS. 8-11, is, preferably, in the form of a stylized head of the earthworm, and provided to function as a hinged lid of the vermicomposting device 10 providing access to composting material in the casing 12. The head member 18 is formed as a hollow single-piece part made, for example, by plastic molding. The head member 18 includes a support portion 36 formed integrally therewith and provided with at least one, but preferably two coaxial pin holes 37 therethrough. In an assembled condition, the pin hole 29 of the hinge support 28 of the body member 14 is coaxial with the pin holes 37 of the support portion 36 of the head member 18 so that the head member 18 is pivotally connected to the body member 14 of the casing 12 of the vermicomposting device 10 with a hinge pin 38 extending through the pin hole 29 of the body member 14 and the pin holes 37 of the head member 18. The head member 18 functions as a closure (or lid) of the internal cavity 13 defined by the hollow body member 14. The head member 18 is movable between a closed position (shown in FIG. 2A) and an open position (shown in FIG. 2B) providing access to the internal cavity 13 in the body member 14 and to the composting material therein.

Figure 9C:
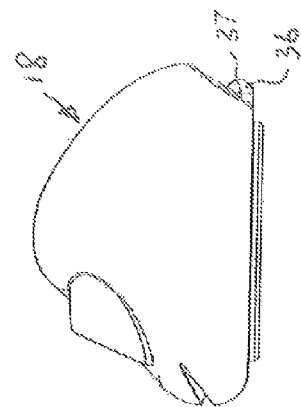
FIG. 9C is a backside view of the head member of the vermicomposting device according to the first exemplary embodiment of the present invention.
Figure 9A:
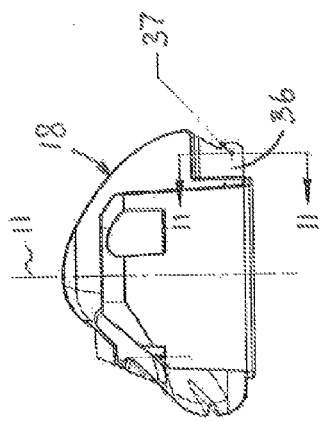
FIG. 9A is a front view of the head member of the vermicomposting device according to the first exemplary embodiment of the present invention.
Figure 11:
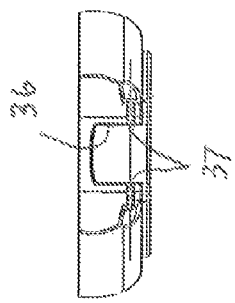
FIG. 11 is a vertical cross-sectional view of the head member of the vermicomposting device according to the first exemplary embodiment of the present invention taken along the lines 11-11 in FIG. 10.
Figure 8:
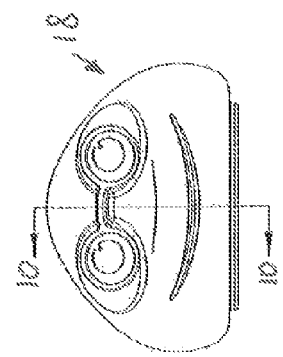
FIG. 8 is a perspective view of a head member of the vermicomposting device according to the first exemplary embodiment of the present invention.
Figure 9B:
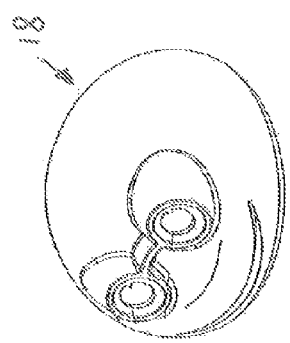
FIG. 9B is a side view of the head member of the vermicomposting device according to the first exemplary embodiment of the present invention.

As illustrated in FIG. 9C, the head member 18 of the vermicomposting device 10 includes a plurality of aeration holes 35 for providing air (oxygen) to compost micro-organisms. Preferably, the aeration holes 35 are provided in the back section of the head member 18 and possibly on a bottom section, and can be done by drilling or integral molding and covered with a mesh screen.

Figure 12:
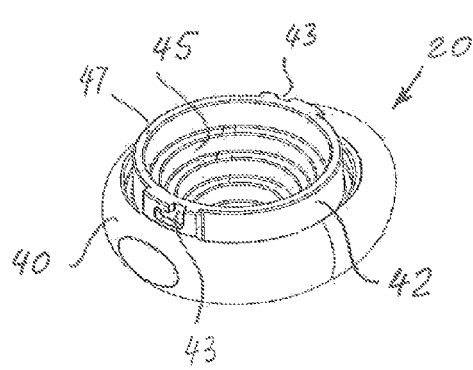
FIG. 12 is a perspective view of a base member of the vermicomposting device according to the first exemplary embodiment of the present invention.
Figure 13A:
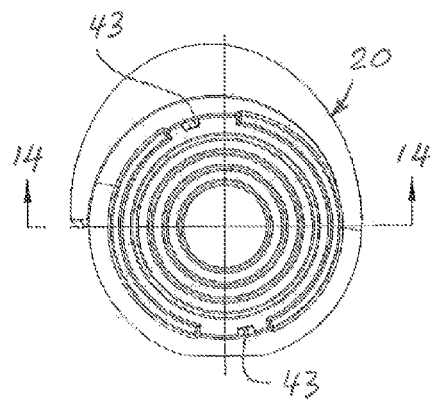
FIG. 13A is a top view of the base member of the vermicomposting device according to the first exemplary embodiment of the present invention.
Figure 13B:
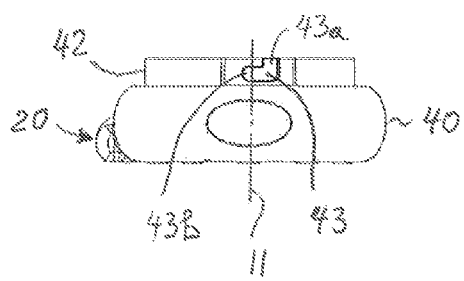
FIG. 13B is a side view of the base member of the vermicomposting device according to the first exemplary embodiment of the present invention.
Figure 14:
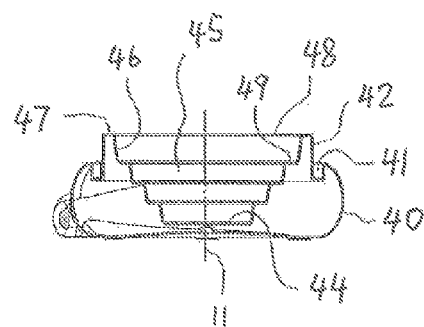
FIG. 14 is a vertical cross-sectional view of the base member of the vermicomposting device according to the first exemplary embodiment of the present invention taken along the lines 14-14 in FIG. 13A.

The base member 20 of the hollow casing 12, illustrated in detail in FIGS. 12-14, is, preferably, in the form of a stylized tail-end portion of the earthworm, and provided to function as a base of the vermicomposting device 10. The base member 20 includes a support portion 40 and a drip bucket 42 mounted to the support portion 40 and defining a container disposed under the body member 14 coaxially therewith. Preferably, according to the first exemplary embodiment of the present invention, the drip bucket 42 is integral with the support portion 40 of the base member 20. Further preferably, the base member 20 including the support portion 40 and the drip bucket 42 is formed as a single-piece part made, for example, by plastic molding.

As further illustrated in FIGS. 12, 13B and 14, the drip bucket 42 is mounted to the support portion 40 so as to extend both into and out of the support portion 40 of the base member 20. The drip bucket 42 is in the form of an open top bucket that includes a circular solid (i.e., without any holes therein) bottom wall 44 surrounded by an annular side wall 46 upwardly extending from said bottom wall toward the body member 14 so as to form a cavity 45. The annular side wall 46 of the drip bucket 42 forms an opening 48 facing the body member 14. Preferably, the annular side wall 46 is substantially conical in shape. Alternatively, the annular side wall 46 can be substantially cylindrical. The opening 48 of the drip bucket 42 is delimited by a substantially annular top surface 47 of the drip bucket 42. Preferably, the drip bucket 42 is further provided with an annular support surface 49 axially spaced from and parallel to the top surface 47 of the drip bucket 42. Both the top surface 47 and the support surface 49 of the drip bucket 42 are coaxial and orthogonal to the central axis 11.

As further illustrated in detail in FIGS. 12-13B, the drip bucket 42 of the base member 20 includes with a pair of opposite L-shaped grooves 43 provided for receiving the inwardly extending pins 34 formed on the support portion 30 of the body member 14 of the casing 10. Moreover, the base member 20 is provided with an annular channel 41 disposed between the support portion 40 and an outer peripheral surface of the drip bucket 42. The annular channel 41 is sized to be complementary to the cylindrical flange skirt 32 of the support portion 30 of the body member 14.

The base member 20 is sized and shaped to receive the support portion 30 of the body member 14 in a telescoping fashion. As further illustrated in detail in FIGS. 12-13B, the outer peripheral surface of the drip bucket 42 (i.e., outside the cavity 45) is provided with a pair of opposite L-shaped grooves 43 provided for receiving the inwardly extending pins 34 formed on the support portion 30 of the body member 14 of the casing 10. The number of grooves 43, which in this embodiment is two, obviously corresponds to the number of the pins 34 on the support portion 30 of the body member 14. The grooves 43 are sized to snugly receive the pins 34. More particularly, as best seen in FIGS. 12 and 13B, each of L-shaped grooves 43 includes an open end 43a and a closed end 43b. The open end 43a is continuous with the top surface 47 of the drip bucket 42 and extends generally axially in the direction generally parallel to the central axis 11 of the vermicomposting device 10. The closed end 43b is a closed-ended groove that extends a distance circumferentially (transversely) from the open end 43a, thereby forming an L-shaped groove.

In operation, during the assembly of the casing 12 of the vermicomposting device 10 according to the first exemplary embodiment of the present invention, the body member 14 is positioned around the annular top surface 47 of the drip bucket 42 of the base member 20 so that the cylindrical flange skirt 32 of the support portion 30 of the body member 14 is inserted into the annular channel 41 and the pins 34 are aligned with the open ends 43a of the L-shaped grooves 43. After the pins 34 are aligned, the body member 14 is advanced further over the base member 20 so that the pins 34 are inserted into the open ends 43a of the L-shaped grooves until the pins 34 abut the end of the open ends 43a. At this point, the body member 14 is rotated so that the pins 34 slide to the closed ends 43b of the L-shaped grooves 43. Accordingly, the body member 14 and the base member 20 are cooperatively configured to form a twist-lock coupling therebetween.

The vermicomposting device 10 further comprises one or more, such as four according to the preferred embodiment of the present invention, of composting trays $50_1$-$50_4$ removably disposed within the internal cavity 24 in the body member 14 of the casing 12 in a stacked relationship (i.e., one on top of the other) in the direction of the central axis 11, as illustrated in FIGS. 3 and 4. These composting trays $50_1$-$50_4$ are substantially structurally identical in this embodiment. In view of their similarity and in the interest of simplicity, the following discussion will use a reference numeral without a letter to designate an entire group of substantially identical composting trays. For example, the reference numeral 50 will be used when generically referring to the composting trays $50_1$, $50_2$, $50_3$ and $50_4$ rather than reciting all four reference numerals.

Figure 15:
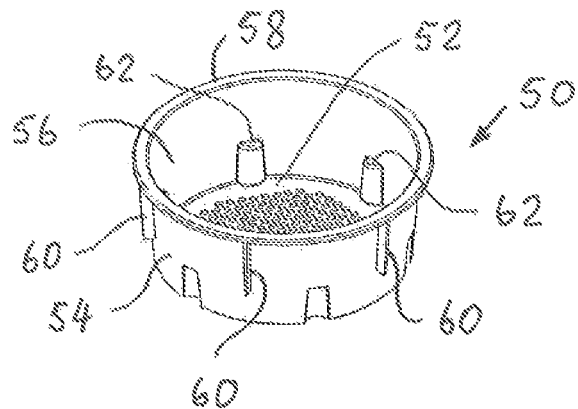
FIG. 15 is a perspective view of a composting tray of the vermicomposting device according to the first exemplary embodiment of the present invention.
Figures 16A, 17:
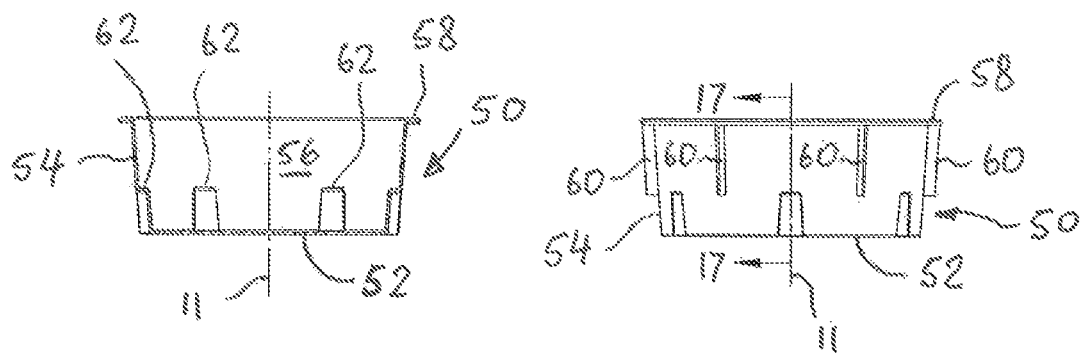
FIG. 16A is a side view of the composting tray of the vermicomposting device according to the first exemplary embodiment of the present invention.
FIG. 17 is a vertical cross-sectional view of the composting tray of the vermicomposting device according to the first exemplary embodiment of the present invention taken along the lines 17-17 in FIG. 16A.
Figure 16B:
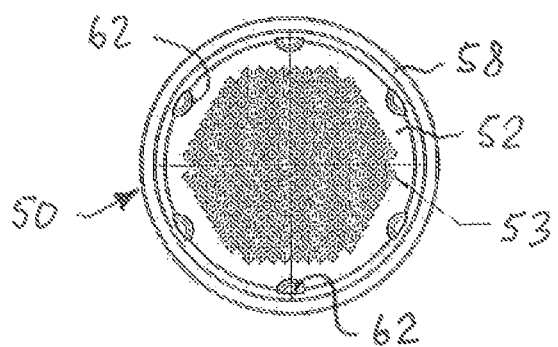
FIG. 16B is a top view of the composting tray of the vermicomposting device according to the first exemplary embodiment of the present invention.
Figure 18:
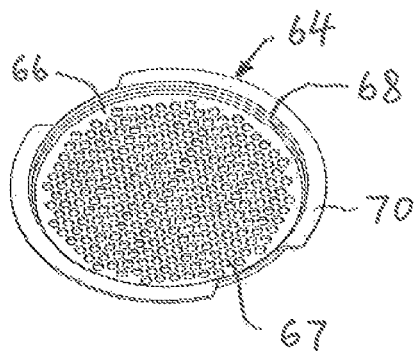
FIG. 18 is a perspective view of a grid member of the vermicomposting device according to the first exemplary embodiment of the present invention.
Figure 19A:
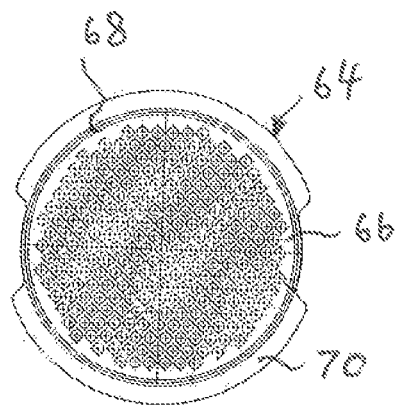
FIG. 19A is a top view of the grid member of the vermicomposting device according to the first exemplary embodiment of the present invention.
Figure 20:
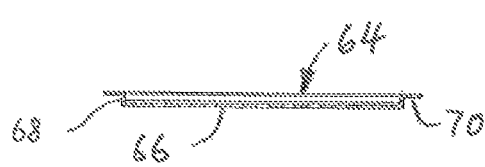
FIG. 20 is a vertical cross-sectional view of the grid member of the vermicomposting device according to the first exemplary embodiment of the present invention taken along the lines 20-20 in FIG. 19B.
Figure 19B:
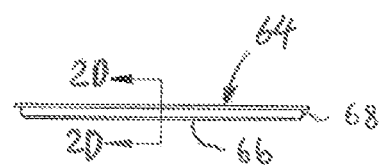
FIG. 19B is a side view of the grid member of the vermicomposting device according to the first exemplary embodiment of the present invention.

As shown in detail in FIGS. 15-17, each of the composting trays 50 is in the form of an open top, substantially cylindrical tray that includes a circular perforated bottom wall 52 surrounded by an annular, substantially conical side wall 54 upwardly extending from the perforated bottom wall 52 substantially along the central axis 11 in the direction toward the head member 18 so as to form a cavity 56 adapted to contain a composting material and/or ready to use compost and worms. Each of the composting trays 50 is provided with a plurality of apertures 53 at the perforated bottom wall 52 thereof. The apertures 53 in each of the composting trays 50 allow the worms to move (migrate) between the composting trays 50 disposed inside the casing 12 of the vermicomposting device 10. Furthermore, each of the composting trays 50 has an annular rim 58 formed at an axially distal end of the side wall 54 and defining an opening of the composting tray 50. Each of the composting trays 50 also has a number, such as six, of axially extending support ribs 60 provided on an outer peripheral surface of the side wall 54 and a number of seats 62 provided on an inner peripheral surface of the side wall 54. Alternatively, the inner peripheral surface of the side wall 54 of the composting tray 50 may be provided with an annular seat coaxial with the central axis 11, instead of the number of seats 62. Preferably, each of the composting trays 50 is formed as a single-piece part made for example by plastic molding. Further preferably, the composting trays 50 are made of a weather-proof, highly insulated material, such as polyethylene resin or bio-based plastic, including biodegradable bioplastics.

As illustrated in FIG. 3, the bottom (lower) one of the composting trays 50 (the composting tray $50_1$) is supported by the drip bucket 42 of the base member 20. Specifically, the support ribs 60 of the lower composting tray $50_1$ are supported by the top surface 47 of the drip bucket 42 of the base member 20. Alternatively, the lower composting tray $50_1$ is supported by both the top surface 47 of the drip bucket 42 supporting the support ribs 60 and by the support surface 49 of the drip bucket 42 supporting the perforated bottom wall 52 of the lower composting tray $50_1$. As further illustrated in FIG. 3, the next composting tray $50_2$ is supported by the lower composting tray $50_1$ so that the support ribs 60 of the composting tray $50_2$ are supported by the annular rim 58 of the lower composting tray $50_1$ so that the perforated bottom wall 52 of the composting tray $50_2$ is axially spaced from the perforated bottom wall 52 of the lower composting tray $50_1$ in the direction of the central axis 11. The composting trays $50_3$ and $50_4$ are similarly supported by the composting trays $50_2$ and $50_3$, respectively.

As further illustrated in FIGS. 3 and 4, each of the composting trays 50 is provided with a grid member 64 removably disposed within one of the composting trays 50. As shown in detail in FIGS. 18-20, the grid member 64 includes a circular perforated bottom wall 66 surrounded by a short annular sidewall 68 upwardly extending from the perforated bottom wall 66 in the direction toward the head member 18 so as to form a cavity adapted to contain a composting material and/or ready to use compost and worms. Each of the grid members 64 is provided with a plurality of apertures 67 at the perforated bottom wall 66 thereof. The apertures 67 in each of the grid members 64 allow the worms to move (migrate) between the grid members 64 and the composting trays 50 disposed inside the casing 12 of the vermicomposting device 10. Furthermore, each of the grid members 64 has an annular rim 70 formed at an axially distal end of the sidewall 68 and defining an opening of the grid member 64. Preferably, each of the grid members 64 is formed as a single-piece part made for example by plastic molding. Further preferably, the grid members 64 are made of a weather-proof, highly insulated material, such as polyethylene resin or bio-based plastic, including biodegradable bioplastics.

As also illustrated in FIG. 3, the grid member 64 is disposed entirely within one of the composting trays 50 so that the perforated bottom wall 66 of the grid member 64 is axially spaced from the perforated bottom wall 52 of the composting tray 50 within which the grid member 64 is disposed. Specifically, the rim 70 of the grid member 64 is supported by the seats 62 provided on the inner peripheral surface of the side wall 54 of the composting tray 50 in an axially spaced relationship relative to the bottom wall 52 of the composting tray 50.

To add composting material into the top composting tray $50_4$, a user opens the upper opening 26 of the body member 14 by pivotally rotating the head member 18 upwardly away from the upper end portion 16 of the body member 14 and places the composting material 26 on the perforated bottom wall 52 of the top composting tray $50_4$, then pivotally closes the head member 18.

The drip bucket 42 is disposed under the composting trays 50 and is provided to receive and collect any liquid byproduct from the vermicomposting process, commonly known as compost tea or "worm tea", that drains down into the drip bucket 42 through the apertures 53 in the perforated bottom walls 52 of the composting trays 50 and the apertures 67 in the perforated bottom walls 66 of the grid members 64. The sidewall 46 of the drip bucket 42 is side wall 46 is substantially conical in shape such that any liquid byproduct drains down generally in one direction toward bottom wall 44 of the drip bucket 42.

The most common worms used in vermicomposting devices, redworms (*Eisenia foetida*, *Eisenia andrei*, and *Lumbricus rubellus*), feed most rapidly at temperatures of 59 to 77° F. (15-25° C.). They can survive at 50° F. (10° C.). Temperatures above 86° F. (30° C.) may harm them. This temperature range means that indoor vermicomposting with redworms is suitable in all but tropical climates. (Other worms like *Perionyx excavatus* are suitable for warmer climates.) If a vermicomposting device is kept outside, it should be placed in a sheltered position away from direct sunlight and insulated against frost in winter. It is necessary to monitor the temperatures of vermicomposting devices (which can have high heat-retaining properties), as the feedstock used can compost, heating up the vermicomposting devices as they decay and killing the worms.

FIGS. 21-33 illustrate a vermicomposting device 110 according to a second exemplary embodiment of the present invention. In FIGS. 21-33, components, which are unchanged from, or function in the same way as in the first exemplary embodiment of the present invention are designated by the same reference numerals as in FIGS. 1-20.

As shown in FIGS. 21-24 and similarly to the vermicomposting device 10 according to the first exemplary embodiment of the present invention, the vermicomposting device 110 comprises a hollow casing 112 extending along a central axis 111 and defining an internal cavity 113 therein. The casing 112 includes a substantially annular, hollow body member 114, a head member 18 and a base member 120. The body member 114 has a lower end portion 115 and an upper end portion 116. Further according to the present invention, the head member 18 is pivotally mounted to the upper end portion 116 of the body member 114, while the base member 120 is removably attached to the lower end portion 115 of the body member 114 for supporting the vermicomposting device 110 in an upright, vertical position on a support surface, such as ground of a backyard.

The casing 112 of the vermicomposting device 110 according to the second exemplary embodiment of the present invention is made in the shape of an animal including a worm, a bug, a reptile, a bird or a mammal. Preferably, as illustrated in FIGS. 21-24, the casing 112 of the vermicomposting device 110 is made in the shape of a stylized earthworm in an upright position.

Each part of the casing 112, i.e. the body member 114, the head member 18 and the base member 120, is made of a weather-proof, highly insulated material, such as polyethylene resin or bio-based plastic, including biodegradable bioplastics.

Figure 25:
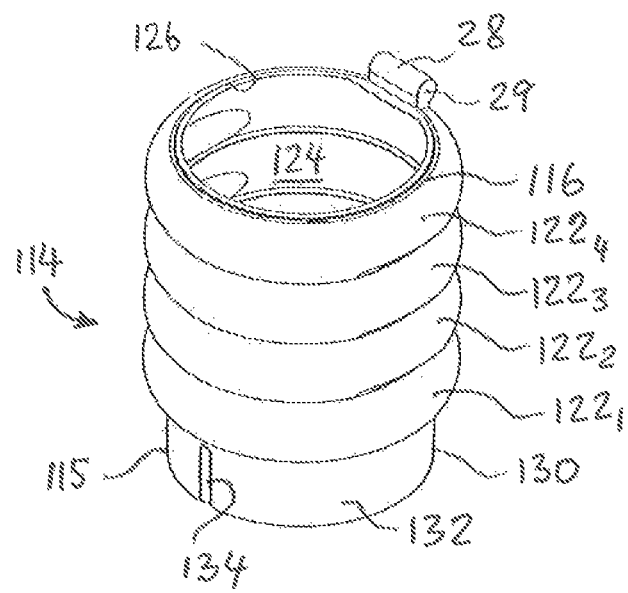
FIG. 25 is a perspective view of a body member of the vermicomposting device according to the second exemplary embodiment of the present invention.
Figure 26:
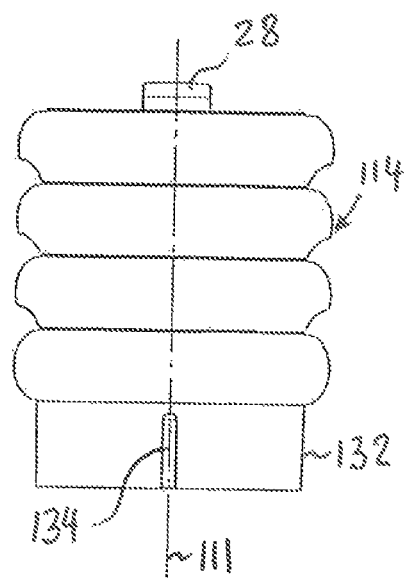
FIG. 26 is a front view of the body member of the vermicomposting device according to the first exemplary embodiment of the present invention.
Figure 27:
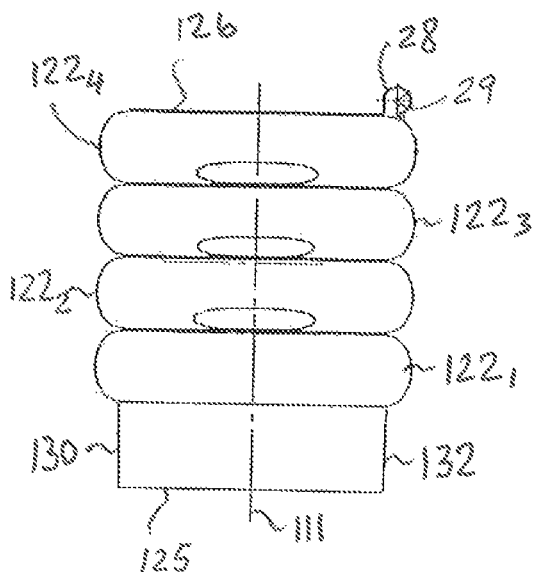
FIG. 27 is a side view of the body member of the vermicomposting device according to the second exemplary embodiment of the present invention.

The substantially annular body member 114 is formed as a hollow single-piece part made for example by rotational molding. Preferably, as illustrated in FIGS. 25-27, the body member 114 includes a number, such as four, ring portions $122_1$, $122_2$, $122_3$ and $122_4$ disposed in a stacked relationship (i.e., one on top of the other) along the central axis 111. Each ring is a surface of revolution generated by revolving a semi-circle in three dimensional space about the central axis 111 coplanar with the semi-circle. The hollow body member 114 is axially open at both the lower end portion 115 and the upper end portion 116, and defines an internal cavity 124 delimited by a circular lower opening 125 at the lower end portion 115 and a circular upper opening 126 at the upper end portion 116 of the body member 114. As shown in FIGS. 26 and 27, the lower and upper openings 125 and 126 are coaxial with each other and with the central axis 111. Disposed within the body member 114 are the composting trays 50 with the grid members 64.

The body member 114 further includes a hinge support 28 formed integrally therewith and provided at the upper opening 126 of the upper end portion 116 of the body member 114. Specifically, as shown in detail in FIGS. 25-27, the hinge support 28 is formed on top of the upper ring portion $122_4$ of the body member 114 so as to extend above the upper opening 126 of the body member 114. The hinge support 28 is provided with a pin hole 29 therethrough.

The body member 114 further includes a support portion 130 fixed to the body member 114 below the lower ring portion $122_1$. The support portion 130 includes a substantially cylindrical flange skirt 132 connecting the body member 114 with the base member 120. As illustrated in detail in FIGS. 25-27, the cylindrical flange skirt 132 is coaxial with the central axis 111 and extends below the lower ring portion $122_1$ of the body member 114. The flange skirt 132 is provided with at least one straight axial groove 134 formed in a cylindrical surface thereof. As illustrated in detail in FIG. 26, the axial groove 134 extends vertically and substantially parallel to the central axis 111. It will be appreciated that while the second exemplary embodiment of the present invention discloses the support portion 130 with two opposite axial groove 134, any appropriate number of the axial grooves 134, such as one, two, three, etc., is within the scope of the present invention.

The head member 18 of the hollow casing 112 according to the second exemplary embodiment of the present invention is generally identical to the head member 18 of the hollow casing 12 according to the first exemplary embodiment of the present invention illustrated in detail in FIGS. 8-11. The head member 18 is pivotally connected to the body member 114 of the casing 112 of the vermicomposting device 110 with a hinge pin 38 (shown in FIG. 24) extending through the pin hole 29 of the body member 114 and the pin holes 37 of the head member 18 shown in FIGS. 9B, 10 and 11.

Figure 28:
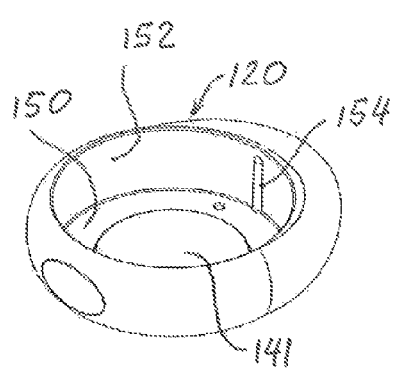
FIG. 28 is a perspective view of a base member of the vermicomposting device according to the second exemplary embodiment of the present invention.
Figure 29A:
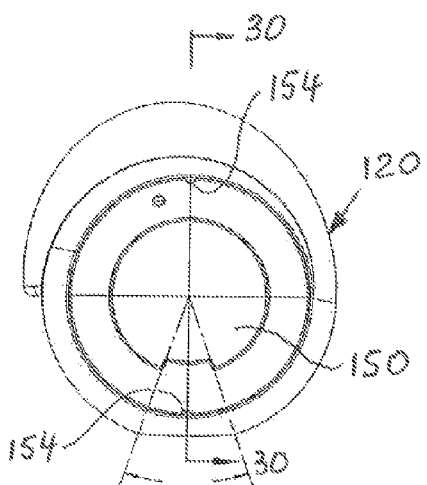
FIG. 29A is a top view of the base member of the vermicomposting device according to the second exemplary embodiment of the present invention.
Figure 30:
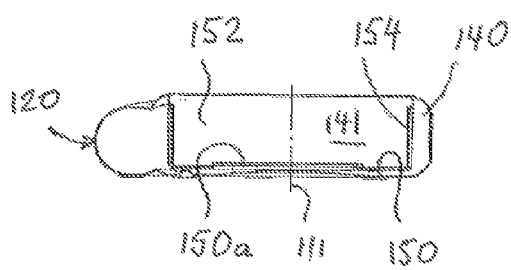
FIG. 30 is a vertical cross-sectional view of the base member of the vermicomposting device according to the second exemplary embodiment of the present invention taken along the lines 30-30 in FIG. 29A.
Figure 29B:
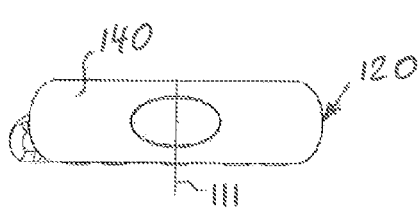
FIG. 29B is a side view of the base member of the vermicomposting device according to the second exemplary embodiment of the present invention.

The base member 120 of the hollow casing 112, illustrated in detail in FIGS. 28-30, is, preferably, in the form of a stylized tail-end portion of the earthworm, and provided to function as a base of the vermicomposting device 110. The base member 120 includes a hollow support portion 140 defining an open top cavity 141 formed by a substantially circular bottom wall 150 surrounded by a substantially cylindrical inner peripheral sidewall 152 upwardly extending from the bottom wall 150 substantially along the central axis 111 in the direction toward the head member 18 so as to form the cavity 141.

Figure 24:
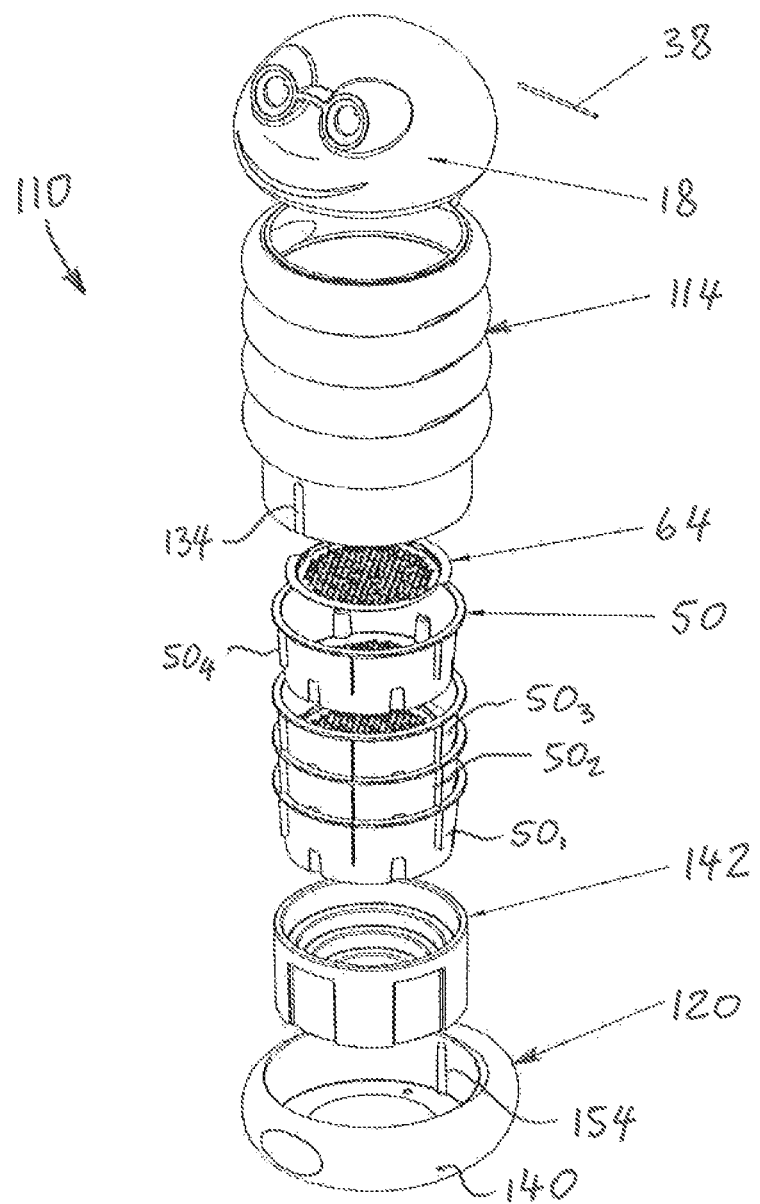
FIG. 24 is an exploded perspective view of the vermicomposting device according to the second exemplary embodiment of the present invention.

As illustrated in detail in FIGS. 24, 28 and 29A, the support portion 140 of the base member 120 is provided with two opposite straight axial ridges 154 formed on the cylindrical inner peripheral sidewall 152 thereof. The axial ridges 154 extend vertically and substantially parallel to the central axis 111. It will be appreciated that the number of axial ridges 154 of the base member 120 corresponds to the number of the axial grooves 134 in the support portion 130 of the body member 114. Moreover, each of the axial ridges 154 is geometrically complementary to the corresponding axial groove 134. Preferably, the base member 120 including the support portion 140 is formed as a single-piece part made, for example, by plastic molding.

In operation, during the assembly of the casing 112 of the vermicomposting device 110 according to the second exemplary embodiment of the present invention, the body member 114 is positioned above the base member 120 so that the cylindrical flange skirt 132 of the support portion 130 of the body member 114 is inserted into the cavity 141 and the axial grooves 134 are aligned with the axial ridges 154 of the base member 120. After the axial grooves 134 are aligned, the body member 114 is advanced further over the base member 120 so that the axial ridges 154 are inserted into the axial grooves 134 of the body member 114 until the flange skirt 132 of the support portion 130 abuts the bottom wall 150 of the base member 120. Accordingly, the body member 114 and the base member 120 are cooperatively configured to form a non-rotatable coupling therebetween.

Figure 31:
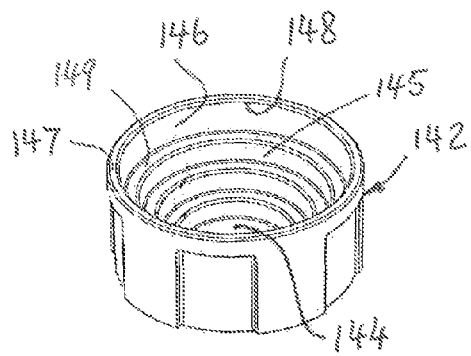
FIG. 31 is a perspective view of a drip bucket of the vermicomposting device according to the second exemplary embodiment of the present invention.
Figure 32A:
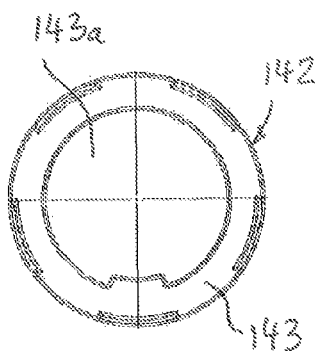
FIG. 32A is a top view of the drip bucket of the vermicomposting device according to the second exemplary embodiment of the present invention.
Figure 33:
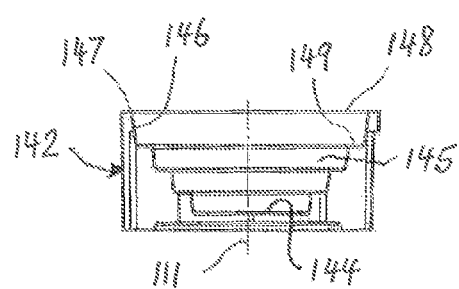
FIG. 33 is a vertical cross-sectional view of the drip bucket of the vermicomposting device according to the second exemplary embodiment of the present invention taken along the lines 33-33 in FIG. 32B.
Figure 32B:
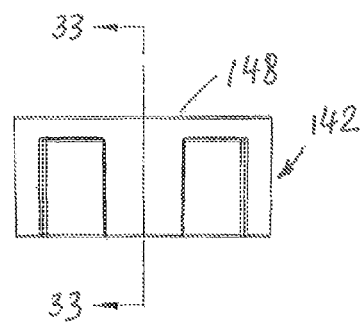
FIG. 32B is a side view of the drip bucket of the vermicomposting device according to the second exemplary embodiment of the present invention.

The vermicomposting device 110 further comprises a drip bucket 142 shown in detail in FIGS. 31-33. As illustrated in FIGS. 23 and 24, the drip bucket 142 is removably disposed in the cavity 141 of the support portion 140 and defines a container disposed under the composting trays 50, in turn located within the body member 114 coaxially therewith. According to the second exemplary embodiment of the present invention, the drip bucket 142 is formed separate from the support portion 140 of the base member 120. Preferably, the drip bucket 142 is formed as a single-piece part made, for example, by plastic molding. Further preferably, the drip bucket 142 is made of a weather-proof, highly insulated material, such as polyethylene resin or bio-based plastic, including biodegradable bioplastics.

As further illustrated in FIG. 23, the drip bucket 142 is removably mounted to the support portion 140 so as to extend both into and out of the support portion 140 of the base member 120. The drip bucket 142 is in the form of an open top bucket defining an open top cavity 145 formed by a circular solid (i.e., without any holes therein) bottom wall 144 surrounded by an annular side wall 146 upwardly extending from the bottom wall 144 in the direction toward the body member 114 substantially along the central axis 111 so as to form the cavity 145. The annular side wall 146 of the drip bucket 142 forms an opening 148 facing the body member 114. Preferably, the annular side wall 146 is substantially conical in shape. Alternatively, the annular side wall 146 can be substantially cylindrical. The opening 148 of the drip bucket 142 is delimited by a substantially annular top surface 147 of the drip bucket 142. Preferably, the drip bucket 142 is further provided with an annular support surface 149 axially spaced from and parallel to the top surface 147 of the drip bucket 142. Both the top surface 147 and the support surface 149 of the drip bucket 142 are coaxial and orthogonal to the central axis 111.

As illustrated in FIG. 23, the bottom (lower) one of the composting trays 50 (the composting tray $50_1$) is supported by the drip bucket 142. Specifically, the support ribs 60 of the lower composting tray $50_1$ are supported by the top surface 147 of the drip bucket 142. Alternatively, the lower composting tray $50_1$ is supported by both the top surface 147 of the drip bucket 142 supporting the support ribs 60 and by the support surface 149 of the drip bucket 142 supporting the perforated bottom wall 52 of the lower composting tray $50_1$. As further illustrated in FIG. 23, the next composting tray $50_2$ is supported by the lower composting tray $50_1$ so that the support ribs 60 of the composting tray $50_2$ are supported by the annular rim 58 of the lower composting tray $50_1$ so that the perforated bottom wall 52 of the composting tray $50_2$ is axially spaced from the perforated bottom wall 52 of the lower composting tray $50_1$ in the direction of the central axis 11. The composting trays $50_3$ and $50_4$ are similarly supported by the composting trays $50_2$ and $50_3$, respectively. In other words, the composting trays 50 are stacked on top of each other and the drip bucket 142 disposed beneath the composting trays 50. As shown in FIGS. 23 and 24, the composting trays 50 and the drip bucket 142 are vertically aligned in the direction of the central axis 111 so that the composting trays 50 are stacked on top of the drip bucket 142. In turn, the drip bucket 142 is stacked on top of the base member 120.

As further illustrated in detail in FIGS. 32A and 33, the drip bucket 142 has a substantially circular end wall 141 substantially perpendicular to the central axis 111 and disposed directly on (i.e., in contact with) the bottom wall 150 of the base member 120 inside the cavity 141 thereof. Moreover, the end wall 141 of the drip bucket 142 is provided with a depression (or recess, indentation) 143a complimentary with a projection 150a formed on the bottom wall 150 of the base member 120. As shown in FIGS. 29A and 32A, the projection 150a and the indentation 143a are irregular in a plane perpendicular to the central axis 111. Thus, in an assembled condition of the vermicomposting device 110, the irregular projection 150a on the bottom wall 150 of the base member 120 is received in the irregular indentation 143a in the end wall 141 of the drip bucket 142 only when the indentation 143a and the projection 150a are aligned in the direction of the central axis 111. Accordingly, the base member 120 and the drip bucket 142 are cooperatively configured to form a non-rotatable coupling therebetween.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A vermicomposting device for vermicomposting organic material, comprising:
    a casing extending along a central axis and including a substantially annular hollow body member defining an internal cavity and having a lower end portion and an upper end portion, a head member mounted to said upper end portion of said body member and a base member removably attached to said lower end portion of said body member for supporting said vermicomposting apparatus on a support surface; and
    a plurality of composting trays removably disposed within said internal cavity in a stacked relationship in the direction of said central axis, each of said composting trays being in the form of an open top tray that includes a circular perforated bottom wall surrounded by an annular side wall upwardly extending from said perforated bottom wall so as to form a cavity adapted to contain a composting material and/or ready to use compost and worms;
    said base member including a support portion and a drip bucket mounted to said support portion and defining a container disposed under said composting trays to receive and collect any liquid byproduct from the vermicomposting process drained down into said drip bucket through said perforated bottom wall of said composting trays;
    said drip bucket being in the form of an open top bucket that includes a circular solid bottom wall surrounded by an annular side wall upwardly extending from said bottom wall toward said composting trays;
    said head member movable relative to said body member so as to provide an access to said internal cavity of said body member.

2. The vermicomposting device as defined in claim 1, further comprising plurality of grid members, each of said grid members removably disposed within one of said plurality of composting trays.

3. The vermicomposting device as defined in claim 2, wherein each of said grid members includes a circular perforated bottom wall surrounded by a short annular sidewall upwardly extending from said perforated bottom wall in the direction of said central axis.

4. The vermicomposting device as defined in claim 3, wherein each of said composting trays including a number of seats provided on an inner peripheral surface of said side wall thereof; and wherein each of said grid members further includes a rim supported by said seats of said composting trays so that said perforated bottom wall of said grid member is axially spaced from said perforated bottom wall of said composting tray within which said grid member is disposed.

5. The vermicomposting device as defined in claim 1, wherein said head member is pivotally mounted to said upper end portion of said body member so as to provide said access to said internal cavity of said body member.

6. The vermicomposting device as defined in claim 1, wherein said drip bucket is integral with said support portion of said base member.

7. The vermicomposting device as defined in claim 6, wherein said drip bucket is formed integrally with said support portion as a single-piece part.

8. The vermicomposting device as defined in claim 1, wherein said drip bucket is separate from said support portion and removably mounted therein.

9. The vermicomposting device as defined in claim 1, wherein each of said plurality of said composting trays includes a perforated plate removably mounted in each of said composting trays so that said perforated plate is axially spaced from said perforated bottom wall of each of said composting trays in the direction of said central axis.

10. The vermicomposting device as defined in claim 1, wherein said body member includes a support portion provided with a substantially cylindrical flange skirt connecting said body member with said base member.

11. The vermicomposting device as defined in claim 10, wherein said support portion provided with an inwardly projecting pin; and wherein said base member is provided with an L-shaped groove configured to receive said inwardly extending pin so as to form a twist-lock coupling between said body member and said base member.

12. The vermicomposting device as defined in claim 10, wherein said flange skirt of said support portion provided with a straight axial groove formed in a cylindrical surface of said flange skirt and extending substantially parallel to said central axis; and wherein said support portion of said base member is provided with a straight axial ridge complementary to said straight axial groove and formed on a cylindrical inner peripheral sidewall thereof and extending substantially parallel to said central axis.

13. The vermicomposting device as defined in claim 1, wherein said body member and said base member are cooperatively configured to form a twist-lock coupling therebetween.

14. The vermicomposting device as defined in claim 13, wherein said body member includes a support portion provided with an inwardly projecting pin; and wherein said base member is provided with an L-shaped groove configured to receive said inwardly extending pin so as to form said twist-lock coupling between said body member and said base member.

15. The vermicomposting device as defined in claim 1, further comprising plurality of aeration holes in said casing, said aeration holes fluidly connecting said internal cavity in said body member with atmospheric air outside said casing.

16. The vermicomposting device as defined in claim 15, wherein said aeration holes are provided in said head member of said casing.

17. The vermicomposting device as defined in claim 1, wherein each part of said casing including said body member, said head member and said base member is made of a weatherproof bio-based plastic material.

18. The vermicomposting device as defined in claim 17, wherein said bio-based plastic material is biodegradable bio-plastic material.

19. The vermicomposting device as defined in claim 1, wherein said casing is made in the shape of an animal including one of a worm, a bug, a reptile, a bird and a mammal.

20. The vermicomposting device as defined in claim 19, wherein said casing is made in the shape of a stylized earthworm in an upright position.

\* \* \* \* \*